Aug. 12, 1947.  K. S. CLAPP  2,425,692
COUPLER
Filed Aug. 19, 1944

INVENTOR.
Kenneth S. Clapp
BY
Wood, Arey, Hesron & Evans
Attorneys.

Patented Aug. 12, 1947

2,425,692

UNITED STATES PATENT OFFICE 2,425,692

COUPLER

Kenneth S. Clapp, Cincinnati, Ohio, assignor to Balcrank Incorporated, Cincinnati, Ohio, a corporation of Ohio Application August 19, 1944, Serial No. 550,200

2 Claims. (Cl. 285—169)

This invention relates to a hydraulic coupler or chuck particularly adapted to be used in a pressure lubricating system. The type of lubricating equipment in most extensive use at the present time involves the concept of using nipples or fittings on the bearings or parts to be lubricated and inserting grease or lubricant into these fitting under pressure. In some instances the grease is very light and fluid in nature and is injected into the fittings by means of a hand-operated grease gun. In other instances, the grease may be very heavy and may be dispensed by means of power-operated pumps generating pressures of six thousand pounds or over.

The purpose of the invention is to provide a coupler for use in lubricating systems of the type now conventional which will perform the two functions of attaching itself to the fitting and injecting grease without leakage more surely and under a greater variety of conditions than other couplers presently available.

The type of fitting most commonly used is known as the headed fitting, and one type, similar to that disclosed in the drawing, comprises a semi-spherical portion protruding from the bearing or part to be lubricated having a flat face with a hole in it at the top of the fitting. The coupler disclosed in the drawing is particularly adapted and designed to be used with a fitting of this type.

In order to operate properly, the coupler must be attached to or attach itself to the fitting sufficiently securely not to be pushed off by high grease pressures of the type indicated. The coupler must also have a sealing connection with the fitting which does not leak under such pressures. The problem of accomplishing these two things is complicated by the fact that fittings themselves are not always manufactured to close tolerances, that is, they vary in size and, moreover, they wear in use so that the desired connection and seal cannot be obtained merely by manufacturing the coupler with great accuracy and to close tolerances.

The present coupler overcomes the difficulties inherent in the couplers previously utilized and proposed in that it embodies fastening means and sealing means which are separate and independently operated. More specifically, the fastening means, preferably clamping jaws of the conventional type, impinge upon the fitting under the pressure of the grease or lubricant being dispensed as is conventional, but preferably impinge only to a degree which is predetermined independently of the sealing means. The latter operates independently of the clamping jaws and under the hydraulic pressure of the lubricant being dispensed moves forward into sealing engagement with the head of the coupler, but under effective pressure less than that applied to the clamping jaws so that the sealing means cannot push the jaws off the fitting.

In the type of coupler commonly in use, the clamping jaws and sealing plunger are so interconnected that it is the sealing plunger which determines the amount of grip the clamping jaws get on the fitting. Therefore, if the fittings vary in length or dimension or are worn or the coupler parts are worn, then either the clamping function or the sealing function is not satisfactorily performed. In the coupler of my invention the clamping jaws close about the headed fitting sufficiently to hold even a worn fitting, but only to a degree determined by a stop preferably built into the wall of the coupler. The sealing plunger, acting independently of the clamping jaws, pushes against the top of the fitting compressing it axially against the clamping jaws, but with a pressure insufficient to part them.

The stop limiting the grip of the coupler on the fitting is particularly useful when frozen fittings are encountered. A frozen fitting is one which will not admit grease because the passageway is clogged; thus when an attempt is made to lubricate it the grease pressure builds up in the coupler to maximum pressure of the grease gun. It is very hard to remove a coupler from a frozen fitting without relieving the grease pressure in the conduit between the grease pump and fitting, and this is particularly true if the jaws have wedged themselves well down around the neck of the fitting. In the coupler of the present invention, the force clamping the coupler to the fitting works against the force providing the sealing connection, and thus the holding force is their differential. Since the holding force is the greater, it will tend to wedge the fitting into the coupler and close about its neck unless a definite travel stop is provided. But if the inward movement of the jaws is limited, the fitting is not forced into the coupler any further than a predetermined distance. Thus the facilitation of the removal of the coupler from frozen fittings is obtained by the separate and independently acting fastening means and sealing means, the sealing means exerting a counter force to the fastening means and by the limitation of the grip of the fastening means.

Other objects and certain advantages of the present invention will be more fully apparent from the further and more detailed description of the drawings in which.

Figure 1:
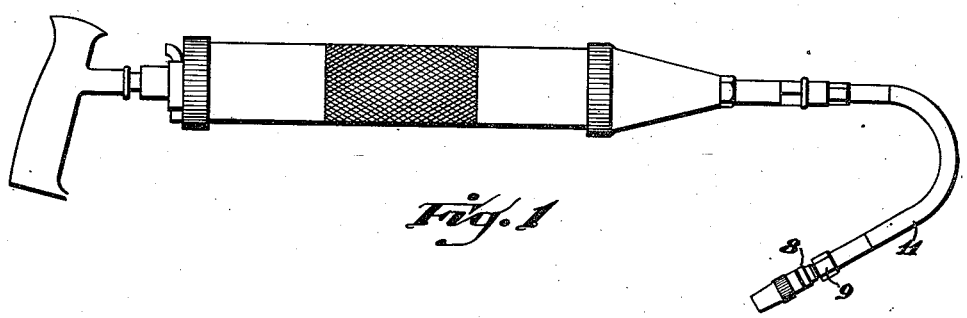
Figure 1 is an elevational view of a coupler of the present invention in connection with a hand-operated grease gun.
Figure 2:
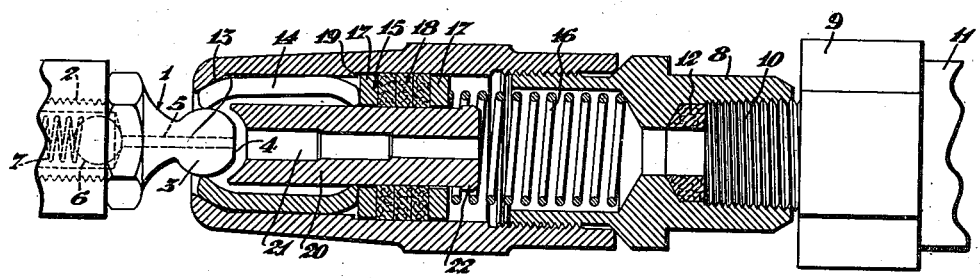
Figure 2 is an enlarged longitudinal sectional view of the coupler in the process of engaging a fitting.
Figure 3:
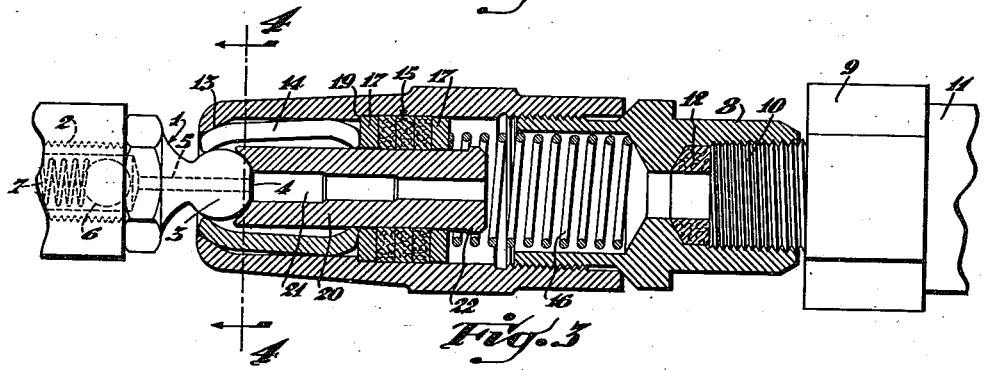
Figure 3 is a longitudinal sectional view similar to Figure 2 but illustrating the fitting fully engaged by the coupler.
Figure 4:
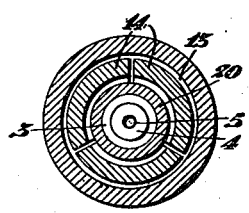
Figure 4 is a cross sectional view taken along the line 4—4 of Figure 3.

In the drawing, the numeral 1 designates a fitting of the usual type having a base 2 which is screwed into the bearing or part to be lubricated, a semi-spherical head 3 adapted to be gripped by the coupler, a flat face 4 at its top, a passageway 5 through it, and a ball valve 6 controlled by spring 7 in the passageway to permit grease to enter but not escape.

The coupler comprises a tubular member 8 adapted to be fixed to a connector 9 by means of screw threading 10; the connector is the terminal member of a grease line 11 in which there is a pump or other means for delivering grease through the line, usually under high pressure. Between the connector and the tubular member is disposed the conventional packing 12. The grease delivery end of the coupler tube is provided with an internally converging wall 13 adapted to cooperate with clamping jaws 14 so that forward motion of these clamping jaws causes them to converge or impinge upon a fitting placed in the end of the coupler. The clamping jaws illustrated are of conventional type, though other designs may be used.

Behind these clamping jaws is an annular plunger 15 adapted to force the jaws forward to clamp a fitting. This annular plunger is urged forwardly by a spring 16 disposed between the plunger and the face of the connector to which the tubular end of the coupler is attached. The annular plunger itself comprises a plurality of washers 17 and packing members 18.

Preferably the bore of the tubular end of the coupler is provided with a shoulder or stop 19 adapted to engage the annular jaw actuating plunger in order to limit the amount of grip or convergence of the jaws on the fitting. Within this annular plunger is a sealing plunger 20 provided with a concave forward face adapted to engage the fitting and seal against it. This sealing plunger 20 has a tubular bore 21 for the passage of grease through it and is provided with a head 22 at its back end, the head being slightly larger than the annular plunger so that the sealing plunger will not fall out of the coupler when not in engagement with the fitting.

In operation the coupler is engaged over a headed fitting, then the grease pressure is applied. The outer annular plunger moves forwardly, presses the jaws forwardly so that they converge against the inclined inner bore at the delivery end of the coupler, thus establishing a lock or grip on the headed fitting. When the annular plunger engages the stop or shoulder 19 the convergence of the jaws is arrested, but the proportioning of the parts is such that the jaws will grip and hold fittings which are undersized within the limits of usual manufacturing tolerances or worn not beyond reasonable limits. Inasmuch as the effective force applied by the annular clamping plunger to the fitting exceeds the force applied by the sealing plunger, the fitting and coupler are effectively secured together mechanically. The hydraulic pressure of the grease also forces the sealing plunger forwardly into engagement with the top of the fitting and inasmuch as there is no operative interlock or engagement between the sealing plunger and the clamping mechanism, the sealing plunger establishes an effective grease-tight seal, regardless of whether or not the fitting is a little bit longer or a little bit shorter due either to manufacturing inaccuracy or wear.

Having described my invention, I desire to be limited only by the following claims:

1. In a lubricating system a coupler adapted for engagement with a headed fitting attached to the part to be lubricated to deliver grease thereto, said coupler comprising a tubular member adapted to pass over and encompass the headed fitting, means actuated by the hydraulic pressure of the grease being delivered to clamp said headed fitting and hold it within the coupler, stop means incorporated in the wall of the tubular member and adapted to be engaged by said means which clamps the fitting for limiting its clamping movement, and a tubular sealing plunger devoid of cooperative connection with the clamping mechanism, adapted to be operated by the pressure of the grease being delivered to establish a sealing connection with the face of the headed fitting, the pressure area of the sealing connection subjected to the hydraulic pressure being less than the pressure area effective for clamping the fitting.

2. In a hydraulic coupler adapted to be attached to a headed fitting, a tubular member, an annular jaw operating plunger mounted within said tubular member and adapted to be urged forwardly axially by grease introduced under pressure into the rear of said tubular member, a tubular sealing plunger slidably mounted within said annular plunger and having its forward end adapted for sealing engagement with the outer face of the headed fitting, jaws disposed about the forward end of said tubular sealing plunger and within said tubular member, said tubular member having an inclined camming surface engaged by said jaws for forcing them inwardly against the rear surface of said headed fitting when the annular jaw operating plunger is urged forwardly; means for limiting the forward movement of the operating plunger, said means comprising an annular shoulder in the tubular member adapted to be engaged by the annular jaw operating plunger when it is urged forwardly by the grease for limiting its forward movement and the degree of clamping pressure exerted, the pressure area of the sealing connection between the tubular sealing plunger and the fitting subjected to the hydraulic pressure being less than the clamping pressure area effective between the jaws and the fitting.

KENNETH S. CLAPP.

REFERENCES CITED

The following references are of record in the file of this patent:

UNITED STATES PATENTS

| Number | Name | Date |
| --- | --- | --- |
| 2,274,753 | Sundholm | Mar. 3, 1942 |
| 2,314,374 | Sundholm | Mar. 23, 1943 |
| 2,061,062 | Davis et al. | Nov. 17, 1936 |
| 2,263,850 | Nielsen | Nov. 25, 1941 |
| 2,274,651 | Barks et al. | Mar. 3, 1942 |